(12) United States Patent
Lestan

(10) Patent No.: US 9,108,233 B2
(45) Date of Patent: Aug. 18, 2015

(54) WASHING OF CONTAMINATED SOILS

(75) Inventor: Domen Lestan, Grosuplje (SI)

(73) Assignee: ENVIT, Enviromental Technologies and Engineering Ltd., Ljubjana (SI)

( * ) Notice: Subject to any disclaimer, the term of this patent is extended or adjusted under 35 U.S.C. 154(b) by 0 days.

(21) Appl. No.: 14/125,094

(22) PCT Filed: Jun. 15, 2012

(86) PCT No.: PCT/SI2012/000039
§ 371 (c)(1),
(2), (4) Date: Dec. 10, 2013

(87) PCT Pub. No.: WO2012/173576
PCT Pub. Date: Dec. 20, 2012

(65) Prior Publication Data
US 2014/0126965 A1 May 8, 2014

(30) Foreign Application Priority Data

Jun. 17, 2011 (SI) .................................... 201100216

(51) Int. Cl.
*B09C 1/02* (2006.01)
*B09C 1/08* (2006.01)

(52) U.S. Cl.
CPC .... *B09C 1/02* (2013.01); *B09C 1/08* (2013.01)

(58) Field of Classification Search
CPC ................................... B09C 1/02; B09C 1/08
USPC ........................................ 405/128.7, 128.75
See application file for complete search history.

(56) References Cited

U.S. PATENT DOCUMENTS

| 4,629,509 A | 12/1986 | O'Hara et al. |
| 5,091,070 A | 2/1992 | Bauer et al. |

(Continued)

FOREIGN PATENT DOCUMENTS

| JP | 2003-310955 A | 11/2003 |
| SI | 23762 A | 12/2012 |

OTHER PUBLICATIONS

International Preliminary Report on Patentability from corresponding International Application No. PCT/SI2012/000039 dated mailed Jan. 3, 2014.

(Continued)

*Primary Examiner* — Frederick L Lagman
(74) *Attorney, Agent, or Firm* — Renner, Otto, Boisselle & Sklar, LLP

(57) ABSTRACT

The process "Washing contaminated soils" solves the problem of cleansing and remediating soils and sediments and their fine fractions contaminated with toxic metals, using washing solution with chelating agents. The chelating agent forms water-soluble complexes with metals and thus facilitates metal removal from soils and sediments into the washing solution. In addition to toxic metals, the process according to the invention enables removal of organic pollutants from soils and sediments by using washing solution amended with surfactants, detergents or organic solvents in addition to chelating agents. The process according to the invention provides for simultaneous separation of the soil and sediment solid phase and used washing solution in a chamber filter press, and effective rinsing of the solid phase to remove all residual mobilized contaminants. The process according to the invention recycles chelating agents and process water in a closed process loop by applying a pH gradient and by using advanced oxidation processes for process water cleansing.

10 Claims, 9 Drawing Sheets

(56) References Cited

U.S. PATENT DOCUMENTS

| | | | |
|---|---|---|---|
| 5,202,033 | A | 4/1993 | Stanforth et al. |
| 5,225,087 | A | 7/1993 | Kardos |
| 5,599,137 | A * | 2/1997 | Stephenson et al. ..... 405/128.75 |
| 5,744,107 | A | 4/1998 | Fristad et al. |
| 5,849,567 | A | 12/1998 | Fischer et al. |
| 5,917,117 | A | 6/1999 | Ensley et al. |
| 5,919,001 | A | 7/1999 | Lin |
| 6,204,430 | B1 | 3/2001 | Baldwin et al. |
| 6,313,374 | B1 | 11/2001 | KrishnaRaj et al. |
| 2009/0245939 | A1 * | 10/2009 | Burns et al. ............... 405/128.75 |
| 2011/0004043 | A1 * | 1/2011 | Basso ............................ 588/318 |
| 2014/0116467 | A1 * | 5/2014 | McCosh et al. .................. 134/10 |

OTHER PUBLICATIONS

International Search Report from corresponding International Application No. PCT/SI2012/000049 mailed Jan. 4, 2013.

Neumaier et al., "Altlasten, Erkennen, Bewerten, Sanieren", Waschen/4.2.2—Extrahieren mit Flussigkeit/4.2.3, Dec. 31, 1996, Springer, Berlin 3, vol. 1, pp. 303-344.

Di Palma et al., "Recovery of EDTA and metal precipitation from soil flushing solutions", Journal of Hazardous Materials, vol. 103, No. 1-2, Oct. 1, 2003, pp. 153-168.

Yang et al., "Destruction of organic pollutants in reusable wastewater using advanced oxidation technology", Chemosphere, vol. 59, No. 3, Apr. 1, 2005, pp. 441-445.

Tejowulan et al., "Removal of trace metals from contaminated soils using EDTA incorporating resin trapping techniques", Environmental Pollution, vol. 13, 1998, pp. 135-142.

Ager et al., "The removal of metals and release of EDTA from pulp wash water", Journal of Wood chemistry and Technology, vol. 21(4), 2001, pp. 413- 425.

Juang et al., "Electrolytic recovery of binary metals and EDTA from strong complexed solutions", Water Res., vol. 34, No. 12, 2000, pp. 3179-3185.

Kim et al., "Recycling of lead-contaminated EDTA wastewater", Journal of Hazardous Material, vol. B69, 1999, pp. 273-286.

Pociecha et al., "Electrochemical EDTA recycling with sacrificial Al anode for remediation of Pb contaminated soil", Environmental Pollution, vol. 158, 2010, pp. 2710-2715.

* cited by examiner

WASHING OF CONTAMINATED SOILS

This application is a national phase of International Application No. PCT/SI2012/000039 filed Jun. 15, 2012 and published in the English language, which claims priority to P-201100216 filed Jun. 17, 2011.

The invention relates to the process "Washing contaminated soils" for remediation of toxic metals contaminated soils and sediments and their contaminated fractions using washing solution with chelating agents. In addition to toxic metals removal, the process described in the invention enables simultaneous removal of organic contaminants from soils and sediments using washing solution that contains chelating agents, as well as surfactants or organic solvents.

In terms of invention, the process belongs to B09C1/02 according to the international patent classification.

The process described in the invention "Washing contaminated soils" fully embraces the process of recycling chelating agent EDTA and process waters according to the invention "Reuse of EDTA after washing of contaminated soils" described in patent application P-201100216 (Agency for Intellectual Property of the Republic of Slovenia). This invention relates to the soil washing (extraction) of contaminated soils and sediments in mixing vessels (reactors), as well as soil leaching in soil heaps and columns. The process described in the invention "Washing contaminated soils" includes the recycling processes described in patent application P-201100216 (Agency for Intellectual Property of the Republic of Slovenia) in a new process of soil and sediment washing in a mixing vessel and separation of soil and sediment solid phases and process waters in a chamber filter press.

CURRENT PROCESSES FOR REMEDIATION OF SOILS AND SEDIMENTS CONTAMINATED WITH TOXIC METALS

The main sources of soil and sediment contamination with toxic metals, such as lead (Pb), copper (Cu), zinc (Zn), cadmium (Cd), mercury (Hg) and nickel (Ni), and metallic radionuclides such as uranium (U), are industrial and traffic emissions, the use of phytopharmaceuticals, mineral and organic fertilizers in farming and accident spills. In contrast to organic pollutants, toxic metals persist in the environment, while radionuclides decay very slowly. Current processes for remediation of soils/sediments contaminated with toxic hazardous metals include:

a. Solidification/stabilization of metals in soils and sediments by mixing or injecting agents such as phosphates (U.S. Pat. Nos. 5,202,033; and 6,204,430), cement, lime or various sulphides (U.S. Pat. No. 4,629,509). These processes do not remove the metals but increase their solid phase share and thus make the metals biologically less accessible.

b. Electro-kinetic processes involve passing a low intensity electric current between a cathode and an anode imbedded in the contaminated soils or sediments. An electric gradient initiates charged particles movement, including metals and radionuclides. The metals/radionuclides can be removed by precipitation at the electrode.

c. Phytoextraction uses metal hyperaccumulating plants with a natural ability to uptake some metals (especially nickel and zinc) and accumulate them in their green parts (U.S. Pat. No. 6,313,374). In induced phytoextraction, chelating agents are applied to the soil to increase the availability of metals (particularly lead) and increase phytoextraction efficiency (U.S. Pat. No. 5,917,117).

d. Physical separation of soil and sediment fractions (clay and colloide fines and organo-mineral complexes) that are highly contaminated with toxic metals, using hydrocyclones and flotation and waste-disposal of separated contaminated fractions.

e. Soil and sediment washing with aqueous washing solutions in situ and ex situ. Washing solutions with various salts, acids and chelating agents are most often used. Processes are known in which solutions of salts whose anions form water-soluble salts with toxic metals are used for washing contaminated soils and sediments (U.S. Pat. No. 5,744,107). Processes of soil and sediment washing are known in which solutions of mineral and organic acids are used to lower soil pH and thus increase the water solubility of toxic metals (U.S. Pat. No. 5,919,001). Chelating agents applied to the soil/sediment form water soluble coordinative compounds (complexes) with toxic metals and metallic radionuclides and in this way transfer metals and metallic radionuclides from the soil solid to the aqueous soil phase, which can then be removed from the soil/sediment. Processes are known in which washing solutions with chelating agents of natural origin are used (U.S. Pat. No. 5,849,567). The best known and most frequent synthetically produced chelating agent used for washing soils and sediments is ethylenediamine tetraacetate (EDTA). The process described in our invention includes the recycling of chelating agents, EDTA is preferentially used, from the used washing solution after soil/sediment washing and separation of the soil/sediment solid phase and liquid phase in a chamber filter press.

Current Processes of Recycling Chelating Agents from Solution After Soil Washing Soil/sediment washing generates large volumes of waste washing solution. The economics of soil/sediment remediation processes requires chelating agent recycling. There are several known processes:

a. A process is known in which toxic metals are separated from EDTA with $Na_2S$ under alkaline conditions, resulting in almost complete recovery of metals through precipitation in the form of insoluble metal sulphides (JP Pat. No. 4263874). This method has been found to have limited application due to the hazardous nature of the reagents and the sludge produced, and cost and operational difficulties.

b. In another known process, EDTA complexes with toxic metals are removed from the washing solution by absorption on an anion-exchange resin (Tejowulan, R. S., Hendershot, W. H. Removal of trace metals from contaminated soils using EDTA incorporating resin trapping techniques. Environ. Pollut., 1998, 103, pp. 135-142).

c. In another known process, zero-valent bimetallic mixtures ($Mg^0$—$Pd^0$, $Mg^0$—$Ag^0$ are used to precipitate toxic metals from the solution while liberating EDTA in alkaline pH. Metals liberated from the EDTA complex are cemented to the surfaces of the excess magnesium or removed from the solution as insoluble hydroxides (Ager, P., Marshall, W. D. The removal of metals and release of EDTA from pulp wash water. J. Wood Sci. Technol., 2001, 21, pp. 413-425). The method is efficient but could be economically prohibitive.

d. An electrochemical process is known for electrolytic recovery of toxic metals and EDTA from washing solution in a two-chamber electrolytic cell separated with a cation exchange membrane to prevent EDTA anodic oxidation (Juang, R. S., Wang, S. W. Electrolytic recovery of binary metals and EDTA from strong complexed solutions. Water Res., 2000, 34, pp. 3179-3185). The method is prone to operational problems, such as membrane fouling and degradation.

e. In another known process, EDTA is recycled from used washing solution by substituting toxic metals with $Fe^{3+}$ under acidic conditions, followed by precipitation of the released metals with phosphate at near neutral pH. $Fe^{3+}$ ions are then precipitated as hydroxides at high pH using NaOH, thus liberating the EDTA (Kim, C., Ong, S-K. Recycling of lead-contaminated EDTA wastewater. J. Hazard. Mater., 1999, B69, pp. 273-286). The cost of the process is affected by high reagent consumption. The process is also inefficient for used washing solutions with a high EDTA:toxic metals ratio, which are the usual product of remediation by soil washing (Di Palma, L., Ferrantelli, P., Merli, C., and Bianifiori, F. Recovery of EDTA and metal precipitation from soil washing solutions." J. Hazard. Mater., 2003, 103, pp. 153-168).

f. In another known electrochemical process, toxic metals and EDTA are separated in a conventional single chamber electrolytic cell under alkaline conditions using a sacrificial Al anode. Al substitutes the toxic metals in complex with EDTA, leaving the Al-EDTA complex (recycled EDTA) in the washing solution. The released toxic metals are removed by electro-precipitation as insoluble hydroxides and by electro-coagulation (Pociecha, M., Lestan, D. Electrochemical EDTA recycling with sacrificial Al anode for remediation of Pb contaminated soil. Environ. pollut. 2010, 158, pp. 2710-2715). The problem of the process is the high cost of the consumed Al.

None of the known processes of chelating agent (preferably EDTA) recycling is similar to the process described in our invention. The process according to our invention resembles in part known processes of EDTA recovery from process solutions generated in technological processes, such as the cleaning of steam generators in nuclear electric plants (U.S. Pat. No. 5,225,087) and after electro-plating with copper (Cu) in the production of printed electro-circuits (U.S. Pat. No. 5,091,070). These two known processes and the process described in our invention share the precipitation of protonated EDTA in acidic media. The main characteristics that distinguish the process according to our invention from known processes are:

a. In known processes the used solution contains only EDTA complexes with Fe and Cu. In the process according to our invention, the used washing solution contains complexes of chelating agent (e.g., EDTA) and toxic metals such as Pb, Zn, Cd and also metals such as iron (Fe), manganese (Mn), magnesium (Mg) and calcium (Ca), which are common and naturally present in soils and sediments. The stability constants of these complexes are different and have minimum and maximum values at different pH, which significantly decreases the efficiency of acidic precipitation of the chelating agent.

b. In the process described in our invention, the efficiency of acidic precipitation of the chelating agent (e.g., EDTA) is improved by the alkaline part of the process, in which Fe and the major part of toxic metals are precipitated from the used washing solution as insoluble hydroxides at pH>10, after they are substituted with Ca in the complex with chelating agent.

c. Known processes (U.S. Pat. No. 5,225,087 and No. 5,091,070) are also distinguished from the process according to our invention by the fact that the known processes are silent about the part of the chelating agent that remains in the solution after precipitation of the major part of protonated chelant (e.g., EDTA). In the process described in our invention, residual EDTA is removed from the solution by oxidative degradation using advanced oxidation processes, such as a combination of ozonation and UV irradiation and electrochemical advanced oxidation processes.

None of the known processes of remediation of soils/sediments contaminated with toxic metals is similar to the process described in our invention. The main characteristics that distinguish the process described in our invention from known processes are:

a. The process described in our invention enables simultaneous removal of toxic metals and organic pollutants from contaminated soils/sediments and their contaminated fractions.

b. None of known processes embody separation of the soil/sediment solid phase from used washing solution and simultaneous rinsing of contaminants from the solid phase. This is achieved, in the process according to our invention by the process in the chamber filter press.

c. In the process described in our invention, ordinary soils and sediments and also soils and sediments and their contaminated fractions with a high content of humic substances, other organic matter, clay, silt and other fines, can be treated by washing. The process described in our invention is therefore also suitable for remediation of fertile and nutrient rich contaminated garden soils.

d. In the process described in our invention, chelating agents (e.g., EDTA) as well as process waters are recycled and reused. The process described in our invention is therefore characterised by very low requirements for fresh water and no or, very low emissions of cleansed process water into the environment.

DESCRIPTION OF THE PREFERRED EMBODIMENT OF THE INVENTION

The process described in our invention is a batch process for remediation of soils and sediments contaminated with toxic metals and organic pollutants. The process described in our invention also enables cleansing of the highly contaminated fraction of fines (mostly composed of humic substances, other organic matter, clays and silts) obtained after physical separation of fines from the less contaminated bulk of the soil and sediment using hydrocyclons or flotation. The process is also suitable for remediation of fertile and nutrient rich contaminated garden soils. Soils and sediments are excavated from the contaminated site, transported to the remediation plant and treated with the process described in our invention and, after remediation, returned to the original site or disposed of in another way.

Soils and sediments (and their highly contaminated fractions) are washed (extracted) with washing solution containing EDTA or other chelating agents with a similar chemical structure. Mixing vessels, reactors and other devices with which one skilled in the art would be familiar are used for washing, to enable the phase of mixing the slurry. The volume ratio between the solid and liquid phases can vary between 1:0.2 and 1:30. During the washing process, chelating agents form water soluble complexes with toxic metals and metals naturally present in the soil/sediment (particularly with iron, Fe) and in this way transfer the metals from the solid phase into the washing solution. The washing solution is prepared by dissolving the fresh chelating agents, e.g., EDTA, (in protonated form or in the form of Na, Ca or other salts) or recycled chelating agents (e.g., EDTA) in fresh water or recycled cleansed process water. The concentration of chelating agents (e.g., EDTA) in the washing solution does not exceed 300 mmol of chelant per kg of air-dried soil/sediment.

To increase the efficiency of the washing (extraction) process, the pH of the washing solution can be adjusted (to pH 4-13, depending, on soil/sediment and contaminants properties) in each batch; calcium hydroxide, lime or lime milk as bases and sulphuric acid ($H_2SO_4$) as acid, are preferentially used for this. The washing solution can also be amended with supporting compounds selected from, but not limited to: surfactants, emulgators, detergents (e.g., Tween 80, Tween 20, Triton X100) and solvents with which one skilled in the art would be familiar to enhance the extraction of toxic metals and metallic radionuclides, as well as various organic pollutants from dual contaminated soils/sediments. Compact materials such as stones and other process oversizes are separated from the contaminated soil/sediment before, after or during the washing (extraction) process, and returned to the original site or disposed of in another way. Vibrating wet screens, trammel screens, sieves or other devices known to one skilled in the art are used for stone separation.

After the washing (extraction) step of the process described in our invention, the preferred embodiment of the invention depends on the type of soil/sediment contamination: dual, with both toxic metals and organic pollutants, or contamination solely with toxic metals.

Description of the Preferred Embodiment of the Invention for Soil/Sediment Contaminated with Both Toxic Metals and Organic Pollutants After washing (extraction) of the soil/sediment in the mixing vessel (FIG. 1, 1) the obtained slurry-phase (batch i) is fed into the chamber filter press (FIG. 1, 2), in which the soil/sediment solid phase is separated from the washing solution (now process water). The soil/sediment solid phase in the chamber filter press is not completely dry and contains some washing solution (pore water) with complexes of chelants (e.g., EDTA) and toxic metals and dissolved organic pollutants. This part of the toxic metals and organic pollutants is removed from the solid phase by rinsing the soil/sediment in the chamber filter press, first with the process water (FIG. 1, 3) that was generated and then cleansed in the previous batch (i−1) in the process described in our invention and afterwards also, but not necessarily, with fresh water (FIG. 1, 4). This fresh water also replaces water lost during the entire process described in our invention. The volume of cleansed process water (batch i−1) and fresh water used for rinsing is such as to ensure that no toxic metals or organic pollutants are present in the process water exiting the chamber filter press (FIG. 2). After rinsing is complete, the soil/sediment solid phase is removed from the press. The cleansed soil/sediment from the press can be crushed and formulated with additives, with which one skilled in the art would be familiar, to improve soil quality (e.g., compost, mineral and organic fertilizers, agricultural hydrogels, vermiculite etc.) and returned to the original site or safely disposed of otherwise.

The process water obtained after separation of the soil/sediment solid phase and the liquid phase and after rinsing the solid phase in the chamber filter press, in the process described in our invention, is alkalinized with calcium hydroxide ($Ca(OH)_2$), lime or lime milk (Ca containing bases) to a pH value higher than 10 (FIG. 1, 5). In the alkaline range of high pH, the stability of EDTA (and of other chelating agents) complexes with toxic metals and iron (Fe) decreases. Consequently, these metals are substituted in the complex with chelating agent by Ca (e.g., Ca-EDTA) and most of the released toxic metals and almost all the Fe are precipitated as insoluble hydroxides (FIG. 3). The precipitated metal hydroxides are removed from the process water, preferably by centrifugation (continuous separation centrifuge) or by filtration, decanting or other means familiar to one skilled in the art (FIG. 1, 6).

After alkaline precipitation and removal of metal hydroxides, the obtained process solution, in the process described in the invention, is acidified to pH<3, whereby most of the chelating agents, e.g., EDTA (>70%) precipitate in insoluble protonated form and are removed by filtration, centrifugation or decanting (FIG. 1, 7). The separated chelating agents (e.g., EDTA) are recycled in this way (FIG. 4). The removal of toxic metals and particularly of Fe in the alkaline phase of the process described in our invention significantly improves the efficiency of the acidic precipitation of chelating agents (FIG. 4). Any acid, but preferentially sulphuric acid (($H_2SO_4$) can be used for acidification of the, process water. When $H_2SO_4$ is used for acidification, the pH of the process water must not fall below pH 1.8. At a lower pH, the Pb-EDTA complex starts to disintegrate and the Pb precipitates as insoluble sulphate ($PbSO_4$) simultaneously with the protonated chelating agent and thus contaminates the recycled chelant, e.g., EDTA (FIG. 5) with Pb. On the other hand, the advantage of using $H_2SO_4$ in the acidic part of the process lies in the combination of using $Ca^{2+}$ (calcium hydroxide, lime, lime milk) in the alkaline part of the process described in the invention. Excess $SO_4^{2-}$ and $Ca^{2+}$ form insoluble calcium sulphate salt ($CaSO_4$), which precipitates and is removed from the process solution. In this way, the build-up of salty ions (from materials used in the process described in the invention) through several batches of soil/sediment remediation is prevented.

After recovery of the major part of the chelants (e.g., EDTA) from the process water in the acidic phase of the process, the remaining, smaller part of the chelating agents and organic pollutants and supporting compounds (surfactants, emulgators, detergents, solvents), which are still present in the washing solution up to this phase of the process, are oxidatively degraded (FIG. 1, 8) using advanced oxidation processes (AOP). A combination of ozonation and UV irradiation can be used for AOP and the metals released after chelant combustion removed from the process water by precipitation, filtration, absorption or other means familiar to one skilled in the art. Electrochemical AOP can also be used for treatment of the process water in the electrolytic cell, with no need to use additional materials for precipitation or absorption of the metals from the treated process water. During anode oxidation, the EDTA and similar chelating agents decay after elimination of acatate functional groups, leading to mineralisation to $CO_2$ (FIG. 6). Released metals precipitate from the process solution as insoluble hydroxides (and are removed by filtration, centrifugation or decanting) and by electro-precipitation on the cathode (FIG. 7). Electro-precipitated metals are removed from the cathode surface mechanically by cutting-off, by dissolution with nitrogen acid ($H_2NO_3$) or by other means known to one skilled in the art. Organic pollutants and supporting compounds are also mineralized by anodic oxidation and removed from the process water. A boron doped diamond anode and platinum (Pt), iridium or rubidium oxide ($IrO_2$, $RuO_2$) on titanium (Ti) substrate can be used for anode material in the electrolytic cell graphite. Stainless steel or other material known to one skilled in the art can be used for the cathode. During AOP and electrochemical AOP, the pH of the treated process water can be left acidic and non-regulated or adjusted to higher values by the addition of base ($Ca(OH)_2$, lime, lime milk). After AOP and electrochemical AOP, the treated process water is clear, colourless and cleansed (without chelating agents, metals, organic pollutants or other compounds and salts).

Part of the cleansed process water (after AOP and electrochemical AOP) is used in the next batch (i+1) in the process described in our invention for rinsing the soil/sediment in a chamber filter press and another part for preparation of washing solution with recycled chelating agent (e.g., EDTA) obtained after acidic precipitation (FIG. 1, 9). An excess amount of cleansed process water is unlikely and it can be safely discharged into the environment. Washing solution with recycled chelating agent is prepared after the addition of $Ca(OH)_2$, lime or lime milk into the suspension of recycled chelating agent (e.g., EDTA) in the cleansed process water until the chelating agent completely dissolves (FIG. 1, 10). During dissolution, the recycled protonated chelant (e.g., $H_4EDTA$) forms complexes with Ca (FIG. 1, 11). Washing solution with recycled Ca-EDTA has the same potential to remove toxic metals from soil/sediment as solution with freshly prepared EDTA, over a wide range of pH (FIG. 8). Any losses of chelating agents that occur during the process described in the invention, which require to be replaced with fresh chelating agent (e.g., $Na_2$-EDTA and Ca-EDTA), can also be added to the washing solution.

Description of the Preferred Embodiment of the Invention for Soil/Sediment Contaminated Solely with Toxic Metals After soil/sediment washing (FIG. 9, 1), the soil/sediment solid phase of the current batch (i) is separated from the used washing solution (process water) in a chamber filter press (FIG. 9, 2). The remaining chelant-mobilized toxic metals are removed from the soil/sediment in the press by rinsing the solid phase with the process waters that were generated and treated in the previous batch (i−1) and afterwards also (but not necessarily) with fresh water (FIG. 9, 14). Cleansed soil/sediment is removed from the press, formulated, returned to the original site or safely disposed.

The first volume of the process water from the press (FIG. 9, 3), which contains a high concentration of chelating agent (e.g., EDTA) and metals (FIG. 2), is alkalinized with $Ca(OH)_2$, lime or lime milk to a pH value higher than 10 (FIG. 9, 5). Alkaline precipitated metal hydroxides are removed (filtration, centrifugation, decanting) from the process water (FIG. 9, 6). After removal of metal-hydroxides, the remaining alkaline process water contains Ca-EDTA (or other chelants complexed with Ca) and is used in full or in part, directly or after pH adjustment to optimal values (preferably with $H_2SO_4$), as a recycled washing solution for soil/sediment washing in the next batch (i+1) of the process described in our invention (FIG. 9, 12). The chelating agent (e.g., EDTA) obtained by acidic precipitation and the required quantities of the fresh chelating agent can be added to the recycled washing solution (FIG. 9, 11). The surplus part of the alkaline process water, which is not used as recycled washing solution, is stored and combined with surplus alkaline process waters from subsequent batches: i to i+n, where n denotes the next 2-10 batches (FIG. 9, 7).

The second volume of the process water from the press (FIG. 9, 4), which contains a low to zero concentration of chelating agent (e.g., EDTA) and metals (FIG. 2), is used as a first process water for rinsing the soil/sediment solid phase in the chamber filter press in the next batch (i+1) of the process described in the invention.

In the process described in the invention, surplus alkaline process water, combined from several consecutive batches (i to i+n) are acidified to pH<3, preferably with $H_2SO_4$ (FIG. 9, 8), whereby the majority of the chelating agent is precipitated in its protonated form (FIG. 9, 10). The precipitated chelating agent (e.g., EDTA) is removed from the process water (filtration, centrifugation, decanting) as recycled chelating agents and the required quantity is added to the recycled washing solution as explained above. The remaining, smaller part of chelating agent in the process water is oxidatively degraded (FIG. 9, 9) using AOP and electrochemical AOP and the released metals removed (precipitation, absorption and filtration, centrifugation and decanting). The obtained cleansed process water (FIG. 9, 13) is used as a second process water for rinsing the soil/sediment solid phase in the press in the next batch (i+1).

The End of the Process According to the Invention

The end of the process according to the invention is characterised in the current batch (i) by the remediated soil/sediment being returned to the original site, safely disposed of or otherwise used; by the cleansed process water for rinsing soil/sediment in the chamber filter press in the next batch (i+1) being prepared; and by the washing solution with recycled chelating agent (e.g., EDTA) being prepared for washing the soil/sediment in the next batch (i+1).

Waste Materials

Precipitated metal hydroxides from the alkaline part of the process described in the invention and metallic residues obtained after treatment of the process water using AOP and electrochemical AOP, represent waste material of the process described in the invention. This material can be recycled and reused as a secondary raw material in the metallurgical industry. Alternatively, these waste materials can be stabilized using hydraulic binders, thermoplast (e.g., bitumen) and other means known to one skilled in the art and safely disposed of as solidified monolithic elements.

Emissions

Washing contaminated soil/sediment, recycling chelating agent (e.g., EDTA) and reuse of process waters are closed-loop processes within the process described in the invention. There are therefore no emissions of toxic metals, chelating agents, organic or other pollutants. Gas emissions from AOP and electrochemical AOP do not represent any hazard to or harmful load on the environment.

Figure 1:
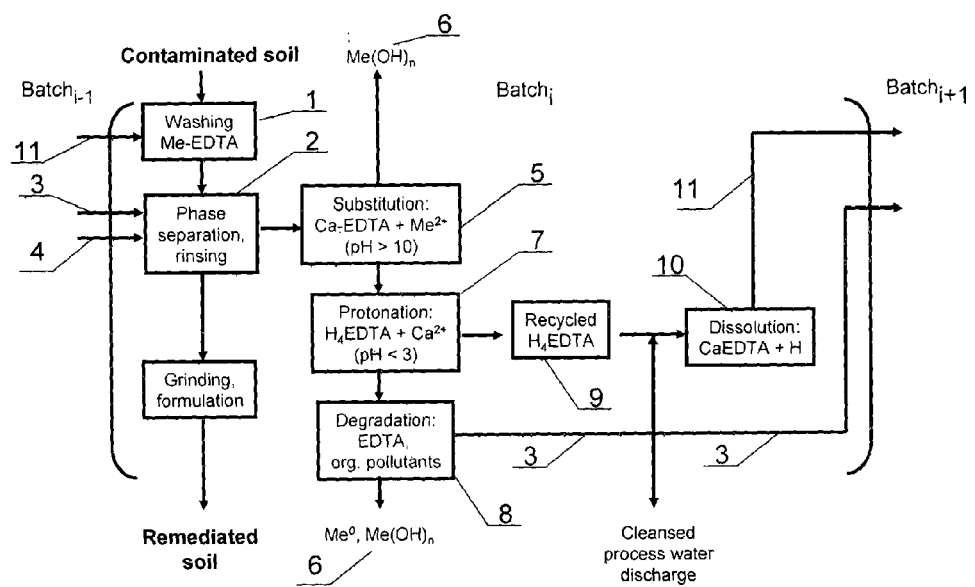
FIG. 1.
Figure 2:
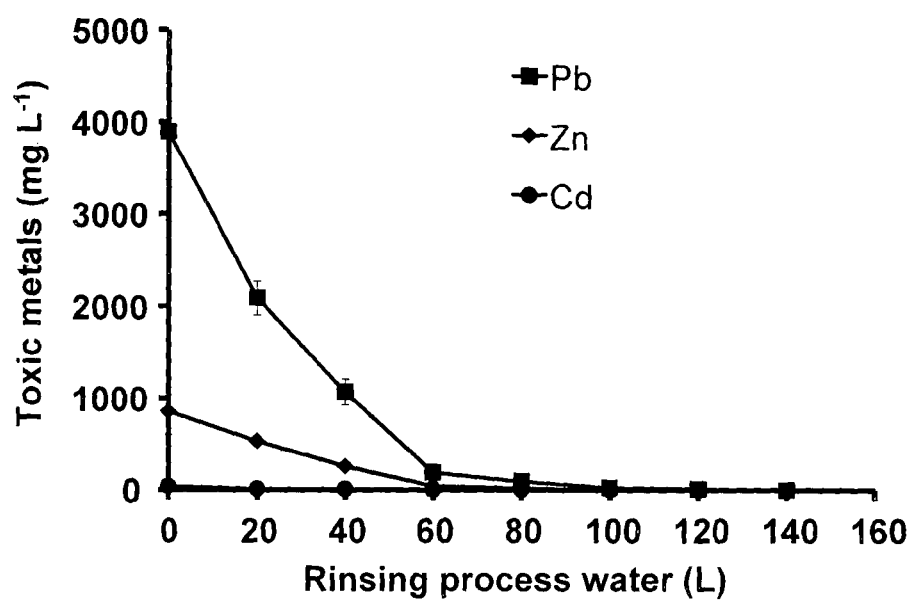
Figure 3:
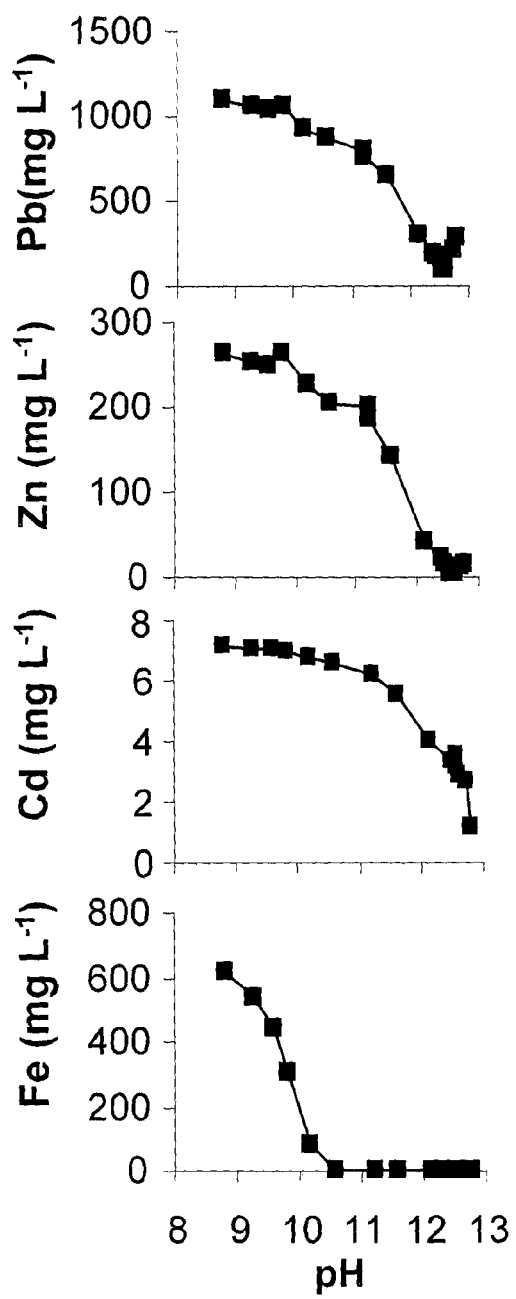
Figure 4:
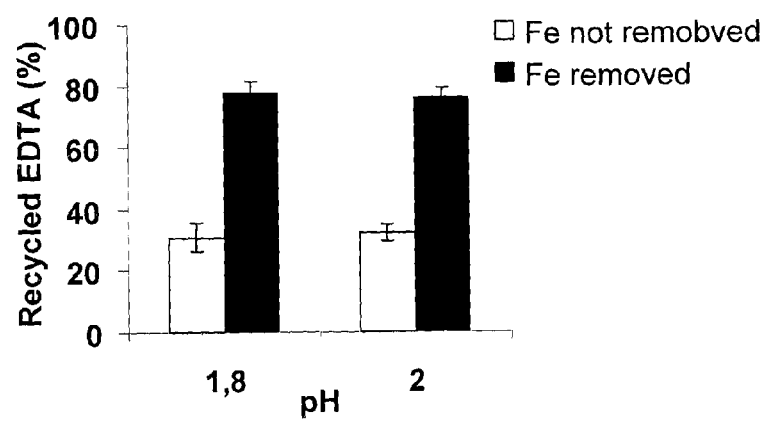
Figure 5:
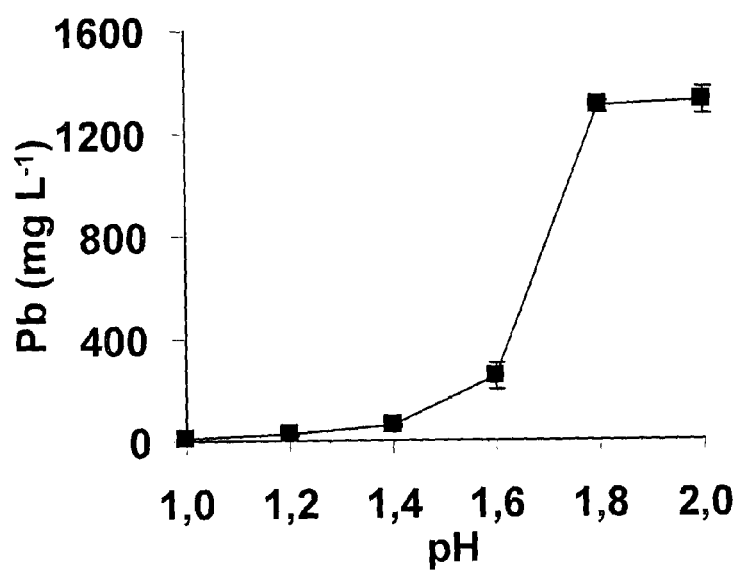
Figure 6:
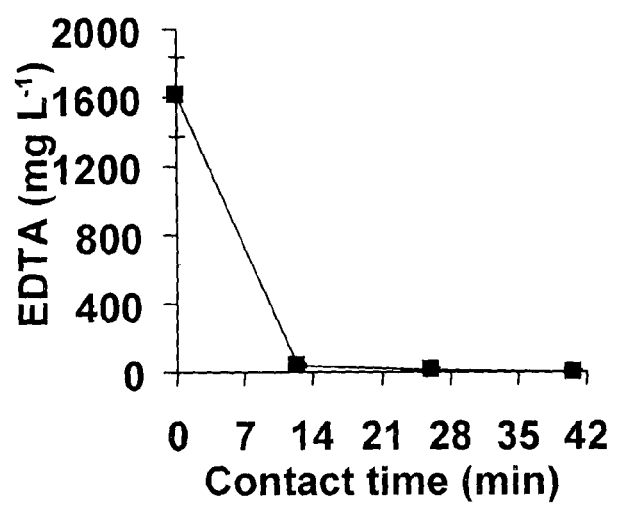
Figure 7:
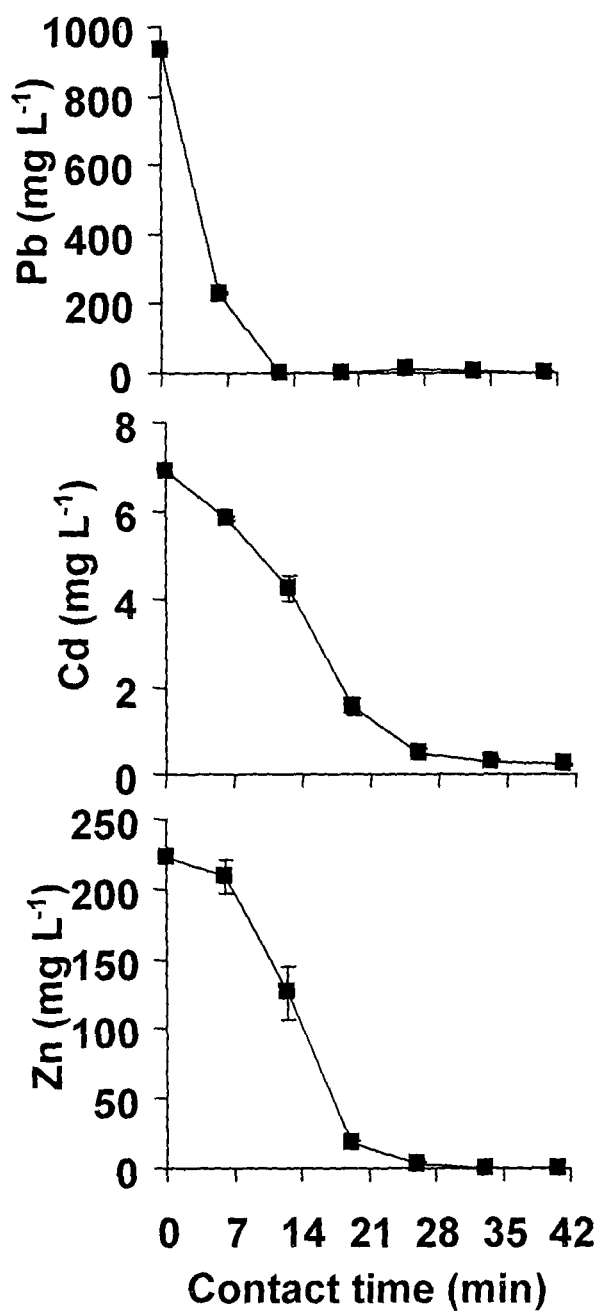
Figure 8:
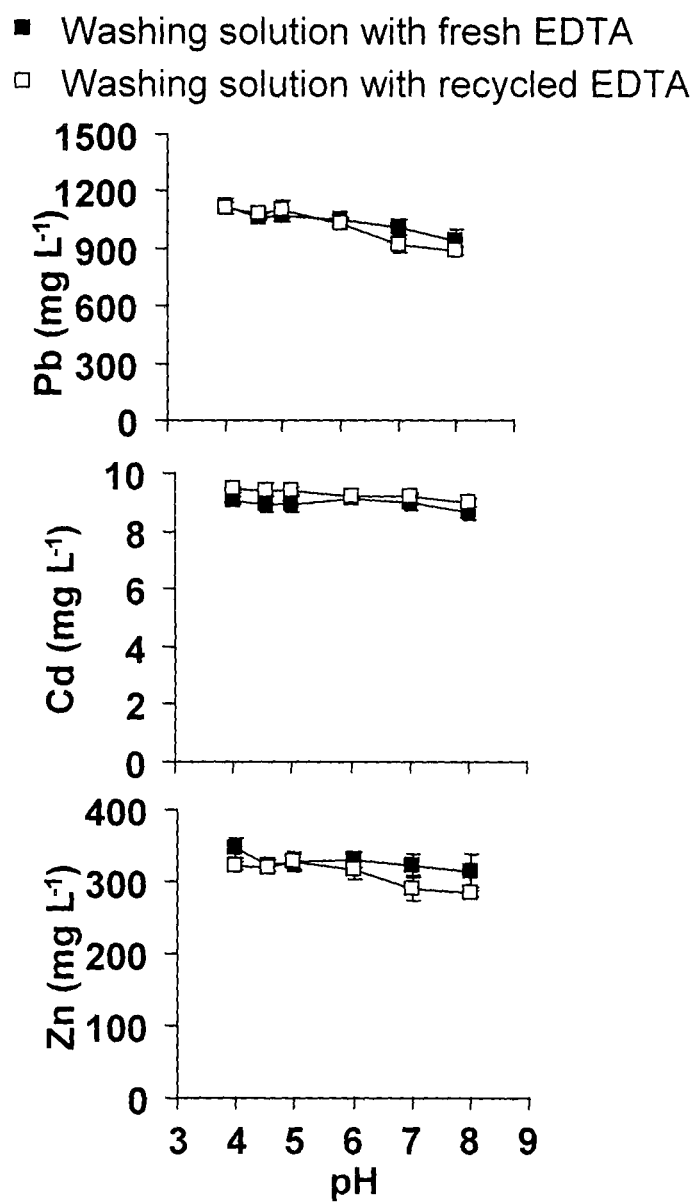
Figure 9:
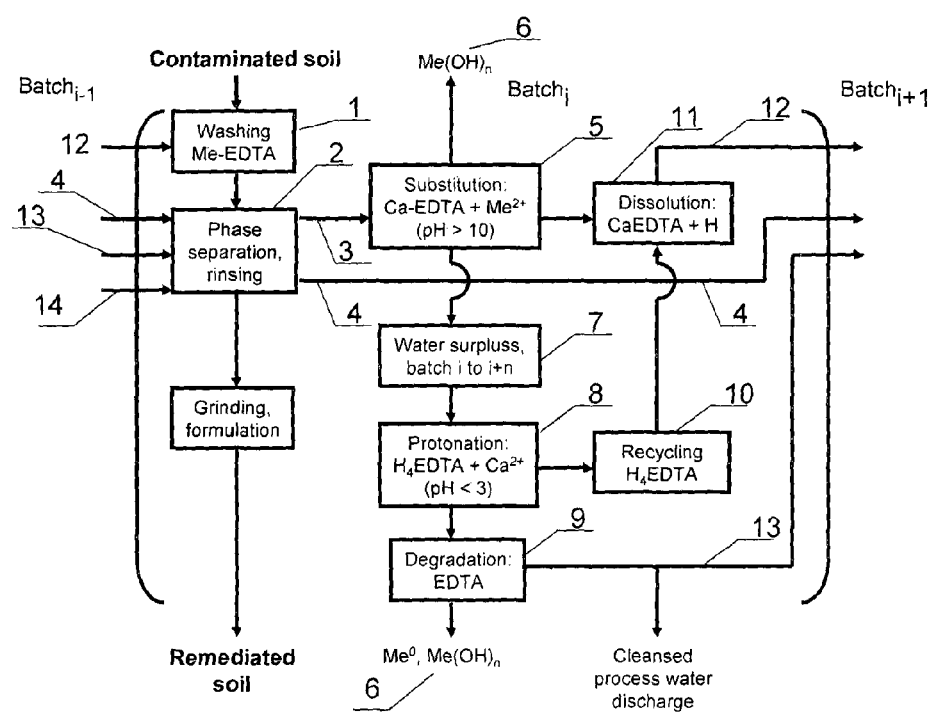

Flowchart of the process according to the invention "Washing contaminated soils", the preferred embodiment of the invention for soil/sediment contaminated with both toxic metals and organic pollutants.

FIG. 2.

Concentration of toxic metals (Pb, Zn and Cd) in volumes of process water obtained from the chamber filter press after separation of the soil/sediment solid phase and washing solution and rinsing of the solid phase with cleansed process water from the previous batch and with fresh water. Results of pilot-scale experiment using 60 kg of contaminated soils.

FIG. 3.

Concentration of toxic metals (Pb, Zn and Cd) and Fe in used washing solution after alkalinization of solution with $Ca(OH)_2$. Toxic metals and Fe are precipitated as hydroxides and almost entirely removed from the solution in alkaline pH. Mean values and standard deviations of three replicates are presented.

FIG. 4.

The, share of recycled EDTA after acidic precipitation using $H_2SO_4$, of the initial total EDTA concentration in the used washing solution. Examples are shown are shown for a solution from which toxic metals and Fe have not been removed and a solution from which toxic metals and Fe have been removed in the alkaline part of the process, according to the invention. Mean values and standard deviations of three replicates are presented.

FIG. 5.

Concentration of Pb dissolved in the used washing solution after acidification of the solution with $H_2SO_4$. Pb starts to precipitate from the solution at pH<1.8. Mean values and standard deviations of three replicates are presented.

FIG. 6.

Concentration of EDTA in the process water during electrochemical AOP using a graphite anode. EDTA is degraded and removed from the process water by anode oxidation. Mean values and standard deviations of three replicates are presented.

FIG. 7.

Concentration of Pb, Zn and Cd in the process water during electrochemical AOP using a graphite anode. Toxic metals were precipitated as insoluble salts and electro-precipitated onto the cathode and thus removed from the process water, yielding cleansed process water. Mean values and standard deviations of three replicates are presented.

FIG. 8.

Efficiency of soil washing with fresh and recycled EDTA (after acidic precipitation) at different pH expressed as Pb, Zn and Cd concentrations in the used washing solution. Mean values and standard deviations of three replicates are presented.

FIG. 9.

Flowchart of the process according to the invention "Washing contaminated soils", the preferred embodiment of the invention for soil/sediment contaminated solely with toxic metals.

I claim:

1. A batch process for remediation of soils contaminated with toxic metals and organic pollutants, in a series of batch processes, said batch process comprising:
   (a) washing a solid phase of contaminated soil with washing solution, said washing solution comprising a chelating agent, wherein soluble complexes of the chelating agent with the toxic metals are formed in the washing solution;
   (b) separating the solid phase from the washing solution by filtration to obtain a washed solid phase and process water;
   (c) rinsing the washed solid phase with a rinsing solution to obtain a rinsed solid phase and a used rinsing solution;
   (d) alkalinisation of the process water obtained in step (b) and of the used rinsing solution of step (c) to a pH value above pH10 using a calcium containing base, thereby precipitating metal hydroxides;
   (e) removing the precipitated metal hydroxides from the process water of step(d);
   (f) subsequently acidifying the process water of step (e) to below pH 3, thereby precipitating the chelating agent in the process water;
   (g) subsequently removing said precipitated chelating agent from the process water;
   (h) subsequently treating said process water by oxidative degradation in an oxidation process, thereby obtaining a cleansed process water;
   wherein a first part of said cleansed process water of step (h) is used as rinsing solution in step (c) of the subsequent batch process in said series of batch processes, and a second part of said cleansed process water of step (h) is combined with removed precipitated chelating agent from step (g) to prepare a washing solution used in step (a) of the subsequent batch process in said series of batch processes.

2. The batch process of claim 1, wherein said chelating agent is EDTA.

3. The batch process of claim 1, wherein said filtration is in a chamber filter press.

4. The batch process of claim 1, wherein the toxic metals are selected from the group consisting of Pb, Zn, Cd, Fe, Mn, Mg, Ca.

5. The batch process of claim 1, wherein said acidification step (f) includes addition of $H_2SO_4$.

6. The batch process of claim 1, wherein the process also removes organic pollutants from said contaminated soil.

7. The batch process of claim 1, wherein the volume ratio of solid to liquid phase in the washing step (a) is from 1:0.2 to 1:30.

8. The batch process of claim 1, wherein the amount of the chelating agent in the washing solution is equal to or below 300 mmol per kg of air dried soil processed.

9. The batch process of claim 1, wherein the pH of the washing solution in step (a) is from pH 4 to pH 13.

10. The batch process of claim 1, wherein said washing solution in step (a) further comprises at least one additive selected from the group consisting of surfactant, emulgator, and detergent.

* * * * *